(12) United States Patent
Takeuchi et al.

(10) Patent No.: US 10,381,172 B2
(45) Date of Patent: Aug. 13, 2019

(54) ELECTRODE PRODUCTION METHOD

(71) Applicant: DE NORA PERMELEC LTD, Fujisawa-shi, Kanagawa (JP)

(72) Inventors: Atsumi Takeuchi, Fujisawa (JP); Tadanori Kishi, Fujisawa (JP)

(73) Assignee: DE NORA PERMELEC LTD, Fujisawa-shi, Kanagawa (JP)

( * ) Notice: Subject to any disclaimer, the term of this patent is extended or adjusted under 35 U.S.C. 154(b) by 78 days.

(21) Appl. No.: 15/749,329

(22) PCT Filed: Aug. 23, 2016

(86) PCT No.: PCT/JP2016/074439
§ 371 (c)(1),
(2) Date: Jan. 31, 2018

(87) PCT Pub. No.: WO2017/038540
PCT Pub. Date: Mar. 9, 2017

(65) Prior Publication Data
US 2018/0226205 A1 Aug. 9, 2018

(30) Foreign Application Priority Data
Aug. 28, 2015 (JP) .................. 2015-168765

(51) Int. Cl.
*H01G 11/86* (2013.01)
*H01M 4/04* (2006.01)
(Continued)

(52) U.S. Cl.
CPC ............ *H01G 11/86* (2013.01); *C25D 17/12* (2013.01); *H01G 11/24* (2013.01); *H01M 4/04* (2013.01);
(Continued)

(58) Field of Classification Search
CPC ......... H01G 11/86; H01G 11/24; H01M 4/04; H01M 4/74; C25D 17/12; C25D 17/06
See application file for complete search history.

(56) References Cited

FOREIGN PATENT DOCUMENTS

| FR | 902136 | 8/1945 |
|----|--------|--------|
| JP | 05-077258 | 10/1993 |

(Continued)

OTHER PUBLICATIONS

International Search Report, issued in the corresponding PCT application No. PCT/JP2016/074439, dated Oct. 18, 2016, 3 pages.

(Continued)

*Primary Examiner* — Jimmy Vo
(74) *Attorney, Agent, or Firm* — Hamre, Schumann, Mueller & Larson, P.C.

(57) ABSTRACT

A method for manufacturing an electrode, which can suppress waste of electrode substrate, prevent impairment of operability, improve flatness and the like, and reliably prevent falling off thereof, and simultaneously can prevent wrinkles and bulges of the electrode caused by the heat treatment and the like, thereby manufacturing a higher-quality electrode. The method includes: preparing a rectangular plate-like electrode substrate having attachment portions at two ends including opposing sides by linearly bending two parts so that each part has an overall even side; holding the attachment portions by the suspension jig and a lower jig each being provided with a movement restriction portion with which a leading end of each attachment portion comes into contact, thereby maintaining the electrode substrate in a suspended state; and performing at least heat treatment on the suspended electrode substrate so as to manufacture a portion for an electrode.

8 Claims, 9 Drawing Sheets

(51) Int. Cl.
*H01M 4/74* (2006.01)
*C25D 17/12* (2006.01)
*H01G 11/24* (2013.01)
C25D 17/06 (2006.01)
C23C 18/16 (2006.01)
C25B 11/03 (2006.01)
C25C 7/02 (2006.01)
C02F 1/461 (2006.01)

(52) U.S. Cl.
CPC ........... *H01M 4/74* (2013.01); *C02F 1/46109* (2013.01); *C02F 2001/46157* (2013.01); *C23C 18/1619* (2013.01); *C25B 11/035* (2013.01); *C25C 7/02* (2013.01); *C25D 17/06* (2013.01)

(56) References Cited

FOREIGN PATENT DOCUMENTS

| | | |
|---|---|---|
| JP | 2000-195503 | 7/2000 |
| JP | 2014-503034 | 2/2014 |
| WO | 2012/144651 | 10/2012 |

OTHER PUBLICATIONS

Extended European Search Report, cited in the corresponding European patent application No. 16841572.7, dated Mar. 26, 2019, 8 pages.

ELECTRODE PRODUCTION METHOD

TECHNICAL FIELD

The present invention relates to a method for manufacturing an electrode, the method including heat treatment and the like performed on an electrode formation surface with an electrode substrate being suspended.

BACKGROUND ART

An electrode catalyst layer is formed on a surface of a conductive electrode substrate by a thermal decomposition method in the following electrodes: for example, an anode and a cathode for generating chlorine such as brine electrolysis; an anode and a cathode for generating oxygen such as copper foil preparation, metal winning, and metallic plating; and an anode and a cathode used for industrial electrolysis such as water electrolysis, and water treatment. An example of a substrate used for the aforementioned electrodes includes a rectangular plate-like electrode substrate such as an expanded metal mesh electrode substrate, and a plain weave mesh electrode substrate in which metal wires are woven in a meshed pattern.

In general, when an electrode surface having an electrode catalyst layer is prepared by the thermal decomposition method on a surface of an expanded metal mesh electrode substrate or a plain weave mesh electrode substrate, the electrode substrate is usually subjected to pretreatment, coating, firing, and post-treatment. Each of the treatments is performed while the electrode substrate is suspended by a suspension jig. In this case, a suspension hole may be provided to the substrate, or a small piece having a suspension hole may be welded to the electrode substrate. A claw portion of the jig is hooked on the suspension hole. Alternatively, the jig and the suspension hole may be fixed with a wire. Accordingly, the electrode substrate is attached to the suspension jig and the electrode substrate is in a suspended state.

However, such a plate-like electrode substrate has very low rigidity. In a case where the substrate and the jig are formed of different materials, they are different in coefficient of thermal expansion. Therefore, in the aforementioned conventional methods for suspending an electrode substrate, the substrate maybe bent, or wrinkles and creases may remain on the substrate during electrode manufacturing operations such as pretreatment, coating, and firing so that it is difficult to maintain final flatness and surface quality of an electrode as a product. There is another problem that the suspension hole may be deformed or broken, which causes a fall and damage of the electrode during the operations.

In order to solve the aforementioned problems, the present applicant has proposed a novel method for suspending a mesh electrode substrate (Patent Literature 1). In the method disclosed in Patent Literature 1, a unique jig is used. This jig includes two plates disposed in parallel and apart from each other so as to form a gap having a predetermined width between the two plates. In this method, upper and lower ends of the mesh electrode substrate are bent alternately, and the ends are processed so as to have a zigzag shape, and these bent portions are inserted into the gap of the jig. Accordingly, the electrode substrate is suspended as being supported by the jig. Such a structure makes it possible to attach the electrode substrate to the jig with good workability, and what is more, it is possible to disperse a suspension load to the entire width of the electrode substrate when the electrode substrate is suspended. Furthermore, since the substrate is not restrained, it is possible to suppress thermal deformation and wrinkles of the substrate generated during firing.

CITATION LIST

Patent Literature

Patent Literature 1: JP 5409967 B1

SUMMARY OF INVENTION

Technical Problem

However, as a result of a further study, the present inventors have found that the aforementioned effects can be obtained by the technique described in Patent Literature 1, but is not satisfactory, leaving room for improvement as described below.

First, under a persistent severe condition such as a heat cycle in which heating and cooling are alternatively repeated, the suspended electrode substrate may come off the jig and fall when downward pulling force is applied the substrate due to a twist of the substrate and creep deformation, or due to external force such as swirling wind generated in a firing furnace at the time of firing. The fall of the electrode substrate is a problem to be avoided in a convincing way since it stops the production line. Therefore, it is desired to hold the suspended electrode substrate more reliably.

In order to prevent the electrode substrate from falling off, in the technique disclosed in Patent Literature 1, it is conceivable to increase a width of portions to be bent into a zigzag shape provided to the ends of the substrate. However, the bent portions are cut off when forming an electrode as a product so that making the bent portions large leads to a waste of electrode substrate and causes another problem of difficulty in inserting the large bent portions into the jig.

On the other hand, in order to reliably prevent the electrode substrate from falling off, it is also conceivable to fix the electrode substrate to the jig with a wire and the like. However, this step complicates the operation for attaching the electrode substrate to the jig, which leads to low productivity. Furthermore, the jig restrains the electrode substrate, which impairs the advantage in the technique disclosed in Patent Literature 1, that is, the capability to suppress thermal deformation due to thermal expansion.

As a result of a further study, the present inventors have also found that, in the electrode substrate proposed in Patent Literature 1, distortion attributed to processes is generated in the vicinity of a boundary between the zigzag portions provided for suspension and an electrode formation surface, and that this distortion causes another problem, that is, wrinkles and bulges originating from this boundary occurs in the electrode as a product. These wrinkles and bulges damage the appearance of the manufactured electrode, causing deterioration in aesthetic aspect. Depending on the extent, it cannot be denied that the wrinkles and bulges may damage an ion exchange membrane that opposes the electrode substrate when being incorporated in an electrolyzer.

The present invention has been made in light of the aforementioned problems, and an object of the present invention is to suspend the electrode substrate in a simple manner when performing electrode manufacturing operations such as heat treatment on an electrode formation surface while suspending a rectangular plate-like electrode substrate with a suspension jig, and to reliably prevent a fall of the electrode substrate which may occur during the electrode manufacturing operations such as the heat treatment, and to solve the problem of wrinkles and bulges on the electrode substrate to enable manufacturing of a higher-quality electrode.

Solution to Problem

The aforementioned object is achieved by the present invention as described below. In other words, the present invention provides a method for manufacturing an electrode, the method including: holding an electrode substrate having a rectangular plate-like shape, being formed with attachment portions at two ends including opposing sides of the electrode substrate so that the electrode substrate is in a suspended state by a suspension jig and a lower jig at the attachment portions; and performing at least heat treatment on a flat electrode formation surface of the suspended electrode substrate so as to manufacture an electrode surface that is to be an electrode, wherein the attachment portions are independently formed at the ends each including one side of the electrode substrate, and each of the attachment portions is formed by linearly bending two parts so that each part has an overall even side, and each of the attachment portions includes a first planar portion that protrudes from the electrode formation surface as a first bent portion is formed by bending the electrode substrate in one surface of the electrode substrate; and a second planar portion that includes the aforementioned one side as an edge and that is formed as a second bent portion is formed by bending an end of the first planar portion so as not to oppose the electrode formation surface and to face the same direction as the electrode formation surface, and wherein the suspension jig includes at least a placement portion having a planar shape, being configured to place the first planar portion; and a movement restrict ion port ion having a contact surface with which the edge at a leading end of the second planar portion comes into contact, and wherein the lower jig includes at least a contact portion having a planar shape with which the first planar portion comes into contact; and a movement restriction portion having a contact surface with which the edge at the leading end of the second planar portion comes into contact, the method comprising: inserting one of the attachment portions into the suspension jig; and inserting the other attachment portion into the lower jig so as to perpendicularly suspend the electrode substrate with the suspension jig and the lower jig, thereafter performing at least the heat treatment on the electrode formation surface while maintaining the electrode substrate in a suspended state.

A preferred embodiment of the method for manufacturing an electrode also includes the following structure. A surface structure with the contact surface of the suspension jig is an inclined surface that is inclined downward toward a placement surface of the placement portion from a position with which the edge comes into contact, or is a curved surface protruding toward the placement surface of the placement portion from the position with which the edge comes into contact; a surface structure with the contact surface of the lower jig is an inclined surface that is inclined upward toward the contact portion from a position with which the edge comes into contact, or is a curved surface protruding toward the contact portion from the position with which the edge comes into contact; the suspension jig is provided with two movement restriction portions having the surface structure at opposing positions; the lower jig is provided with two movement restriction portions having the surface structure at opposing positions; the movement restriction portion is designed in such a manner that an angle $\theta 1$ formed by a tangential line of a circular arc track that is drawn when the edge moves relative to the contact surface is set to $90°\pm45°$; the electrode substrate having a rectangular plate-like shape is in a meshed pattern; and the suspension jig has an elongated shape equivalent to or longer than a length of each end of the electrode substrate formed with the attachment portions.

Advantageous Effects of Invention

According to the present invention, the following effects can be achieved.

(1) The attachment portions provided to the rectangular plate-like electrode substrate of the present invention are provided at two ends including opposing sides. Each attachment portion has an extremely simple structure with two linearly bent parts each having an overall even side. Therefore, as compared to the case described in Patent Literature 1, it is extremely easy to process the electrode substrate of the present invention. Furthermore, the attachment portions of the plate-like electrode substrate can be inserted into the suspension jig and the lower jig in an extremely simple way and in a short time, which improves productivity. Still further, structures of the suspension jig and the lower jig provided for inserting the attachment portions are also simplified.

(2) According to the present invention, distortion hardly occurs in the vicinity of a boundary between the electrode formation surface and the attachment portions. Therefore, it is possible to solve the problem that wrinkles and bulges originating from this boundary occur in the electrode substrate which is to be a product, and it is possible to provide a higher-quality electrode as a product.

(3) In regard to the attachment portion and the suspension jig according to the present invention, the edge at the leading end of the second planar portion of the attachment portion in the electrode substrate is configured to come into contact with the contact surface. Therefore, as will be described later, "resistance against pulling force" is markedly improved, which makes it possible to significantly reduce a possibility that the electrode substrate suspended during electrode manufacturing operations falls from the suspension jig.

(4) The attachment portions provided at the ends of the electrode substrate are cut off after being subjected to the heat treatment and the like to form an electrode surface. Alternatively, the attachment portions are flattened by a roller and the like so as to be used as attachment parts when attaching the electrode to an ion exchange membrane. In regard to this point, the attachment portions according to the present invention have the extremely simple structure as described above. Therefore, compared to the conventional suspending methods, it is possible to markedly reduce the parts to be cut, which improves economic efficiency in production of the electrode. Alternatively, the bent portions can be easily flattened with a roller, and using these parts, the electrode can be easily and reliably attached to the ion exchange membrane, which facilitates the operation for attachment.

DESCRIPTION OF EMBODIMENTS

The present invention will now be described in detail with reference to a preferred embodiment of the invention. The present inventors have recognized that the method for suspending an electrode substrate previously proposed in the Patent Literature 1 has a problem such that the resistance against downward pulling force is not sufficient, and there is a new problem that wrinkles and bulges may occur in an electrode as a product. The present inventors have studied intensively to solve these problems. As a result of the intensive study, compared to the suspending method proposed in Patent Literature 1, the present inventors have found a way to markedly improve the "resistance against pulling force" with significantly simple process and operations for suspending an electrode substrate so that the electrode substrate is prevented from slipping out and falling off a suspension jig, and what is more, the present inventors have found a way to solve a problem of wrinkles and bulges that occur on an electrode when heat treatment is performed on the electrode substrate to form the electrode, thereby completing the present invention.

Figure 1A:
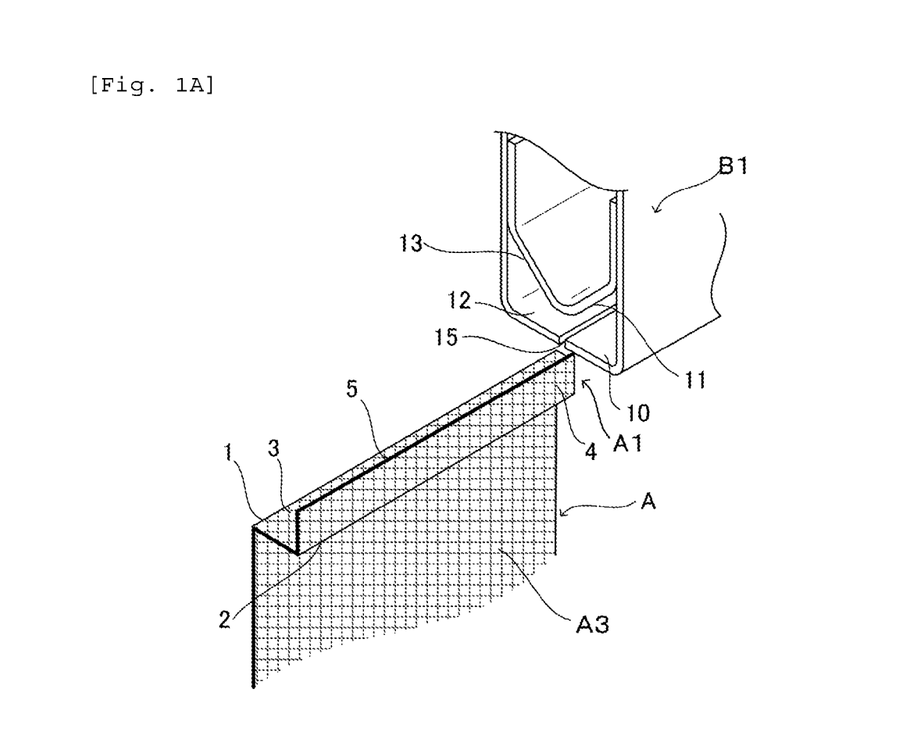
FIG. 1A is a schematic perspective view for illustrating a state in which an attachment portion A1 provided to a plate-like electrode substrate A is to be inserted into an exemplary suspension jig B1 of the present invention.
Figure 1B:
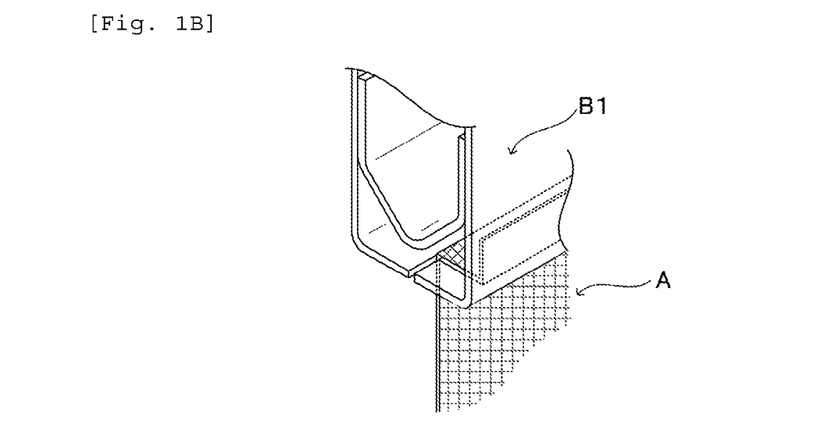
FIG. 1B is a schematic perspective view for illustrating a state in which the attachment portion A1 provided to the plate-like electrode substrate A is inserted into the exemplary suspension jig B1 of the present invention.

In the present invention, a rectangular plate-like electrode substrate is formed with attachment portions at two ends including opposing sides. Each attachment portion is designed to have an easily processable structure such that each attachment portion has two linearly bent parts each having an overall even side as illustrated in FIG. 1A. Furthermore, in the present invention, the attachment portions having such a simple structure are inserted into a unique suspension jig and a lower jig having a simple structure so that it is extremely easy to slideably hold and suspend the rectangular plate-like electrode substrate. According to the aforementioned structure of the present invention, even though the structure is composed of extremely simple combination as illustrated in FIGS. 1A and 1B, the resistance against the downward pulling force applied to the electrode substrate advances to a high level which is previously unattainable in the related art. Hereinafter, this point will be described.

First, as described above, in the present invention, an attachment portion A1 is inserted into a suspension jig B1. In this state, a first planar portion 3 of a rectangular plate-like electrode substrate A (hereinafter referred to as the "electrode substrate A") is steadily mounted on a plane (a placement surface 10) of a placement portion of the jig B1 by its own weight so that the electrode substrate A does not slip out of the jig B1. Furthermore, the suspension jig B1 is provided with a movement restriction portion C that has a structure including a contact surface 11 with which an edge 5 at a leading end of a second planar portion 4 in the attachment portion of the electrode substrate A comes into contact. With such a structure, even though the electrode substrate A is not fixed to a holding tool with a wire and the like, the aforementioned state is maintained, and the electrode substrate A does not slip out of the jig B1.

Figure 2A:
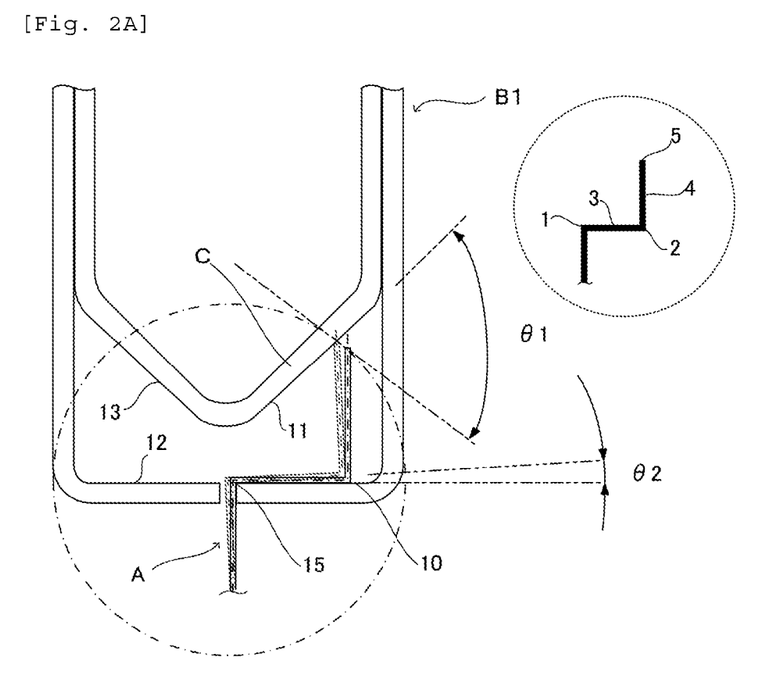
FIG. 2A is a schematic view for illustrating a relationship between the attachment portion A1 provided to the plate-like electrode substrate A and the suspension jig B1 shown in FIG. 1A when the attachment portion A1 is inserted into the suspension jig B1.
Figure 2B:
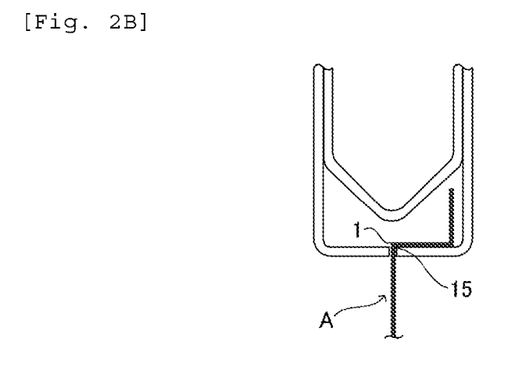
FIG. 2B is a schematic view for supplementarily illustrating FIG. 2A.
Figure 2C:
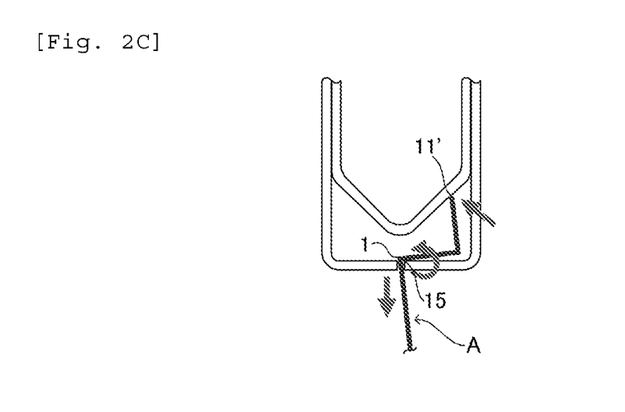
FIG. 2C is a schematic view for supplementarily illustrating FIG. 2A.

In regard to this point, with reference to FIGS. 2B and 2C, hereinafter details in a case where the electrode substrate A is pulled downward and a load equivalent to or larger than the weight of the substrate is applied to the electrode substrate A are described. Since the electrode substrate A is not fixed, the electrode substrate A rotates about a first bent portion which is indicated by the reference numeral 1 in FIGS. 2B and 2C, or the vicinity of the first bent portion as a fulcrum. However, the movement restriction portion C having the contact surface 11 is provided to the suspension jig B1 so that the edge 5 at the leading end of the attachment portion of the electrode substrate A that moves in an arcuate manner due to the rotation comes into contact with the contact surface 11. In this case, unless an excessive load is applied, the first planar portion 3 and the second planar portion 4 of the substrate do not deform and the edge 5 is still in contact with the contact surface 11 provided to the suspension jig B1. In this state, as illustrated in FIG. 2C, the attachment portion A1 of the electrode substrate A is in contact with at least two points: a point contacting at least a corner 15 or an end of the placement portion of the suspension jig B1 (the edge 1 or the edge of the first bent portion), and a point indicated by the reference numeral 11', that is, the edge 1 and the edge 5. Therefore, the electrode substrate A is fixed without slipping out of the jig B1. In short, the structure of the present invention does not rely on friction force between the electrode substrate A and the suspension jig B1, but resistance against the substrate deformation (buckling) play a role as fixing force so that the electrode substrate A does not easily slip out of the suspension jig.

Figure 6A:
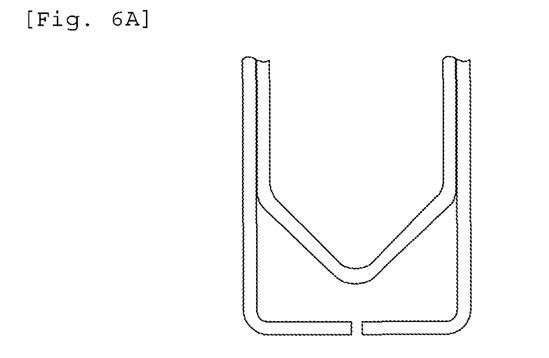
FIG. 6A is a schematic view for illustrating an embodiment of a movement restriction portion having a contact surface in the suspension jig B1 shown in FIG. 2A.
Figure 8:
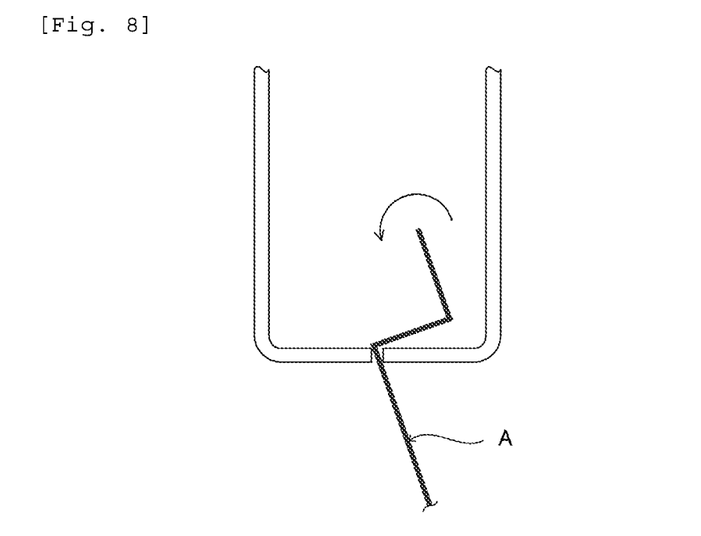
FIG. 8 is a comparative schematic view for illustrating that the attachment portion A1 provided to the plate-like electrode substrate A of the present invention largely rotates in a case where the movement restriction portion having the contact surface is not provided to the suspension jig.

In the present invention, the case where the electrode substrate A rotates about the first bent portion (edge 1) as a fulcrum is illustrated, but the electrode substrate A is not fixed so that the edge 1 is not necessarily corresponds to the corner 15 of the end of the placement portion of the suspension jig B1. However, the electrode substrate Amounted on the plane (the placement surface 10) of the placement portion of the jig B1 is under its own downward weight so that the electrode substrate A does not slide widely on the placement surface 10. Even though the electrode substrate A slides to some extent, it rotates about a fulcrum close to the edge 1. More preferably, as illustrated in FIGS. 1A and 6A, the movement restriction portion specified by the present invention is provided at two opposite positions so that a side surface of the suspension jig is shaped symmetrically, and a gap (slit) that is formed at the center of the movement restriction portion in the suspension jig to allow the attachment portion to be inserted thereinto is made narrow so that the electrode substrate A rotates about a fulcrum much closer to the edge 1. With such a structure, it is easy to apply the following design theory regarding a fixing method when designing the movement restriction portion C. Furthermore, with such a structure, there is an operational advantage that the electrode substrate A can be inserted into this slit without considering an orientation of the attachment portion provided to the electrode substrate A. As illustrated in FIG. 8, in the case where no movement restriction portion having a contact surface is provided, the electrode substrate A rotates freely around the edge 1 as a fulcrum and cannot be fixed.

In the present invention, the electrode substrate A can be suspended more reliably in a preferable state by designing the movement restriction portion C having the contact surface 11 provided to the suspension jig B1 as described below. This point will be described in detail with reference to FIG. 2A, and FIGS. 2B to 2D that supplements FIG. 2A. In other words, in a preferred embodiment of the present invention, regarding a contact angle $\theta 1$ when the electrode substrate A rotates about the edge 1 as the fulcrum, and then the edge 5 at the leading end of the electrode substrate A comes into contact with the contact surface 11 of the suspension jig B1, the contact angle $\theta 1$ is required to be close to 90° (90°±45°) as the design theory regarding the fixing method. The reason for setting the aforementioned condition as the preferable design requirement will be described below. When the electrode substrate A rotates about the edge 1 as the fulcrum, a rotational moment (force) acts on the edge 5 at the leading end of the electrode substrate A and the electrode substrate A comes into contact with the contact surface 11 of the movement restriction portion C. In this case, in order to efficiently transmit fixing force as the force, the contact angle $\theta 1$ is preferably set to 90°. Accordingly, in the present invention, it is more preferable to design an angle of the contact surface 11 of the movement restriction portion C so that the contact angle $\theta 1$ becomes close to 90°. Specifically, it is still more preferable to design the contact angle $\theta 1$ to about 90°±15°). It should be noted that the contact angle $\theta 1$ is a parameter that fluctuates depending on a shape of the contact surface 11 (for example, the degree of inclination). Widths of the first planar portion 3 and the second planar portion 4 of the attachment portion A1 of the electrode substrate A and the like.

Figure 2D:
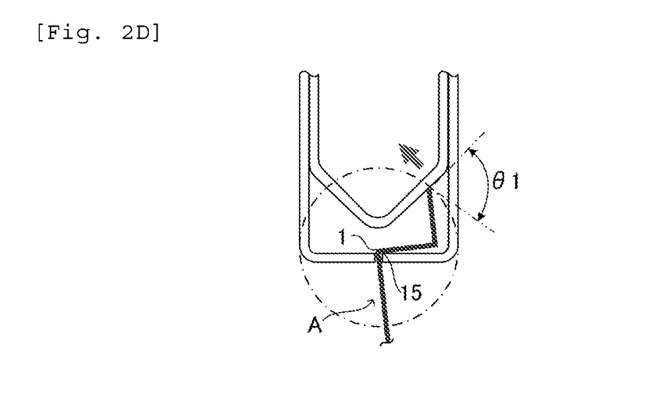
FIG. 2D is a schematic view for supplementarily illustrating FIG. 2A.

The dashed circle illustrated in FIG. 2D represents a track of the edge 5 at the leading end of the electrode substrate A when the electrode substrate A rotates about the edge 1 as the fulcrum. The angle when the electrode substrate A comes into contact with the contact surface 11 of the movement restriction portion C is represented by $\theta 1$. This angle $\theta 1$ largely affects the vector in a perpendicular direction (the thick arrow in the drawing) on the contact surface 11 at the contact point. Force in the perpendicular direction applied to the contact surface 11 of the movement restriction portion C can be represented by $x \times \sin \theta$, where x represents the original force. Therefore, contacting at an angle of 90° ($\pi/2$) indicates that sine is equal to 1 so that the force of the rotational moment can be efficiently transmitted to the contact surface 11. Accordingly, in order to efficiently transmit the rotational moment of the electrode substrate A to the contact surface 11 and to convert the rotational moment into the force to fix the substrate, it seems reasonable to design the contact surface 11 in such a manner that the contact angle $\theta 1$ satisfies the design requirement, 90°±45°, as described above.

Figure 3:
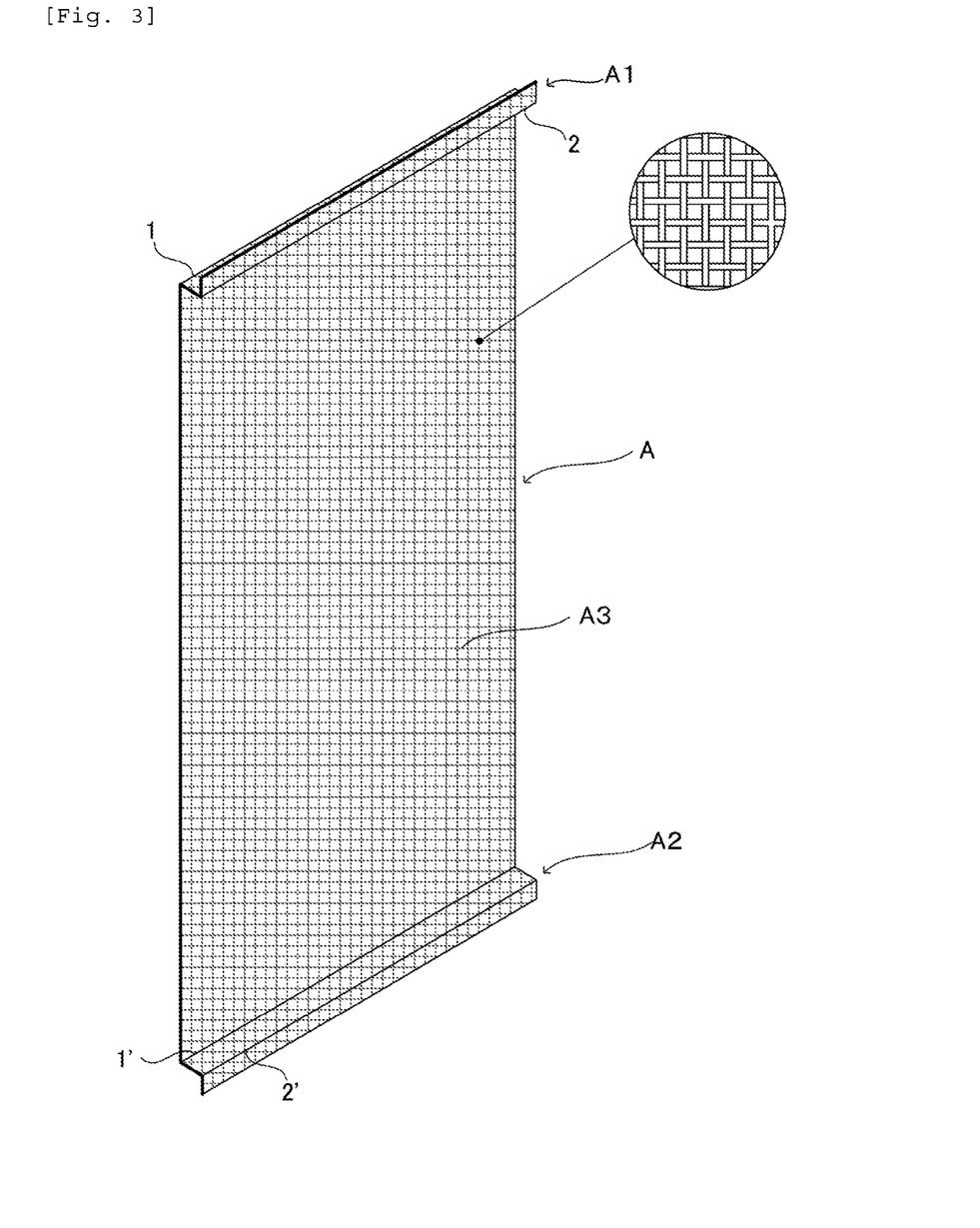
FIG. 3 is a schematic perspective view for illustrating the attachment portion A1 and an attachment portion A2 provided to the exemplary plate-like electrode substrate A of the present invention.

In order to check high "pulling force" achieved by the aforementioned structure, the present inventors have conducted the following studies, using electrode substrates made of a similar material and having a similar shape. Specifically, a thin plain weave mesh electrode substrate made of nickel, having a size of length×width (mm)=600× 400, a wire diameter of $\varphi=0.15$ mm, and a nominal mesh size (the number of lines or the number of meshes included in 1 inch) equal to 40 was used herein. As illustrated in FIG. 3, at two ends of this woven wire electrode substrate including opposing sides of the electrode substrate, attachment portions were formed by linearly bending two parts each having an overall even side, thereby obtaining the electrode substrate specified in the present invention. Specifically, each end of the substrate was bent twice almost at right angle, and a width between a first bent portion close to a flat surface of the substrate and a second bent portion was designed to be 6 mm, and a width between the second bent portion and a leading end of the substrate was designed to be 7 mm. As a suspension jig and a lower jig, those having the structure illustrated in FIGS. 1A and 2A were used. Specifically, the suspension jig and the lower jig each of that is formed with the movement restriction portion C having the contact surface 11 design in such a manner that $\theta 1$ illustrated in FIG. 2A becomes an angle of 81.94° and $\theta 2$ becomes an angle of 3.54° were used. It should be noted that $\theta 2$ represents an angle at which a first planar portion of the electrode substrate separates from a contact portion of the suspension jig as an edge 1 of the electrode substrate serving as a fulcrum. For comparison, a test was carried out using an electrode substrate provided with zigzag attachment portions at ends thereof and a suspension jig as described in Example 1 of Patent Literature 1. The zigzag shape formed herein was a typical shape described in Patent Literature 1.

While each electrode substrate being suspended by each jig, a downward tensile test was performed by applying a load to a lower portion of each electrode substrate. As a result, in the conventional suspending method using the electrode substrate provided with the zigzag attachment portions at the ends, the electrode substrate was pulled out at 5 to 7 kgf. On the other hand, in the suspending method using the electrode substrate specified in the present invention, the electrode substrate was not pulled out even at 20 kgf. The result indicates that, compared to the conventional method, four times or more resistance against pulling force can be achieved by the method specified in the present invention.

Hereinafter, a method for manufacturing an electrode according to a preferred embodiment of the present invention will be described with reference to the drawings. First, the electrode substrate A formed with the attachment portions at two ends including opposing sides, the suspension jig B1, and the lower jig B2 of the present invention will be described.

<Electrode Substrate A>

FIG. 3 is a schematic perspective view illustrating an example of the electrode substrate A. The electrode substrate A is made from a conductive substrate. The conductive substrate is made of a plate material having a plurality of through holes such as an expanded metal, a punching metal, and a plain weave woven wire. FIG. 3 illustrates a case of using a plain weave woven wire. Typically, Ti is used for a conductive substrate serving as an anode, and Ni is used for a conductive substrate serving as a cathode. As an example of these conductive substrates, it is preferable to use a surface-roughened substrate subjected to blasting by a known method as pretreatment.

As illustrated in FIG. 3, in the present invention, the electrode substrate A is formed with the attachment portion A1 and an attachment portion A2 at both ends including two opposing sides. A central portion of the electrode substrate A is a flat electrode formation surface A3 which is to be an electrode product after being subjected to heat treatment and the like. In FIG. 3, the attachment portions A1 and A2 are formed in the same direction with respect to the electrode formation surface, but the attachment portions A1 and A2 are not limited thereto. One attachment portion may be formed in the opposite direction so that the attachment portions face different directions. For example, the attachment portion A2 which is to be inserted into the lower jig may be shaped differently from the attachment portion A1.

The attachment portions A1 and A2 are provided at two ends including opposing sides of the rectangular conductive substrate, and the attachment portions A1 and A2 are configured as described below. As illustrated in FIG. 1A and FIG. 3, each attachment portion is formed by linearly bending two parts so that each part has an overall even side. Accordingly, in the structure of the attachment portion, the first bent portion 1 is formed by bending the electrode substrate A in one side thereof so that the first planar portion 3 protruding from the electrode formation surface is formed. As an end of the first planar portion 3 is bent to form the second bent portion 2, the second planar portion 4 having one side of the electrode substrate A as the edge 5 is formed so as not to oppose the electrode formation surface and to face the same direction as the electrode formation surface. In either case where two parts are linearly bent so that each part has an overall even side, those parts may be bent, for example, at right angle or at an angle close to right angle. Such an angle can be easily obtained, for example, by preparing an elongated block having a right-angled portion, mounting the right-angled portion on the surface of the substrate, and bending the substrate with the right-angled portion. However, it should be noted that the angle at two parts of the conductive substrate that are bent linearly to have an overall even side is not limited to the aforementioned embodiment, and may be any angle as long as it satisfies the aforementioned design requirement in consideration of the shape of the jig.

The widths formed when bending the first planar portion 3 and the second planar portion 4 of the attachment portion are not particularly limited. For example, the widths may be about 5 to 10 mm. The present inventors have studied and verified that the resistance against the downward pulling force is large in a case where the width of the first planar portion 3 is set to 6 mm and the width of the second planar portion 4 is set to 5 mm, and even in a case where the width of the first planar portion 3 is set to 6 mm and the width of the second planar portion 4 is set to 7 mm, indicating that the resistance herein is sufficient enough to prevent the substrate from falling off. More specifically, in the former structure, in the after-mentioned relationship between the jigs B1 and B2, the jigs are designed so as to set θ1 illustrated in FIG. 2A to an angle of 80.43° and θ2 to an angle of 14.94°. In this case, when being moved downward about 1.6 mm, the substrate stopped moving. In the latter structure, the jigs are designed so as to set θ1 illustrated in FIG. 2A to an angle of 81.94° and θ2 to an angle of 3.54°. In this case, when being moved downward about 0.4 mm, the substrate stopped moving. These results show great resistance in both structures. Each width to be bent can be designed to several millimeters, and this fact indicates that each attachment portion to be cut off when manufacturing an electrode as a product can be made as minute as about 10 to 20 mm from the end of each attachment portion. Accordingly, the conductive substrate can be used more efficiently, which leads to economical use of resources.

<Suspension Jig B1>

Figure 4:
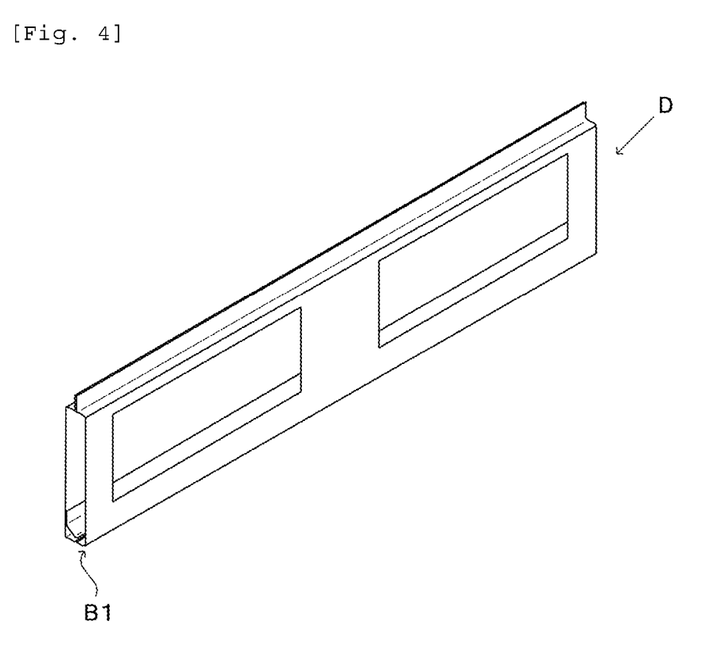
FIG. 4 is a schematic perspective view illustrating an example of the suspension jig B1 of the present invention.

FIG. 6A is a schematic view of a side end of the suspension jig B1 used in the present embodiment into which the attachment port ion A1 of the substrate is to be inserted. FIG. 1A is a perspective view schematically showing that the attachment portion A1 provided to the substrate is to be inserted into the suspension jig B1 illustrated in FIG. 6A. FIG. 4 is a schematic perspective view of an example of the suspension jig B1 of the present invention. FIGS. 6B to 6E, and FIGS. 7A and 7B are schematic views for illustrating other embodiments of the suspension jig B1.

The suspension jig B1 of the present invention includes the planar placement surface 10 for placing the first planar portion 3 of the electrode substrate A; and the movement restriction portion C having the contact surface 11 with which the edge 5 at the leading end of the second planar portion 4 of the electrode substrate A comes into contact. In the suspension jig B1 of the present embodiment shown in FIGS. 1A, 2A, and 4, the movement restriction portion C having the contact surface 11 is configured as a groove shaped gutter having a V shape, and the suspension jig B1 includes a frame D configured to sandwich and hold side surfaces of the gutter from both sides. The frame D is provided with the planar placement surface 10 for placing the first planar portion 3 of the electrode substrate A. Although the placement surface 10 illustrated herein has a planar surface, the present invention is not limited thereto. For example, the placement surface 10 may have an inclined surface as long as it is capable of placing the first planar portion 3 formed by bending. The placement surface 10 may be of any shape as long as it can achieve the aforementioned principle for fixing.

Figure 5:
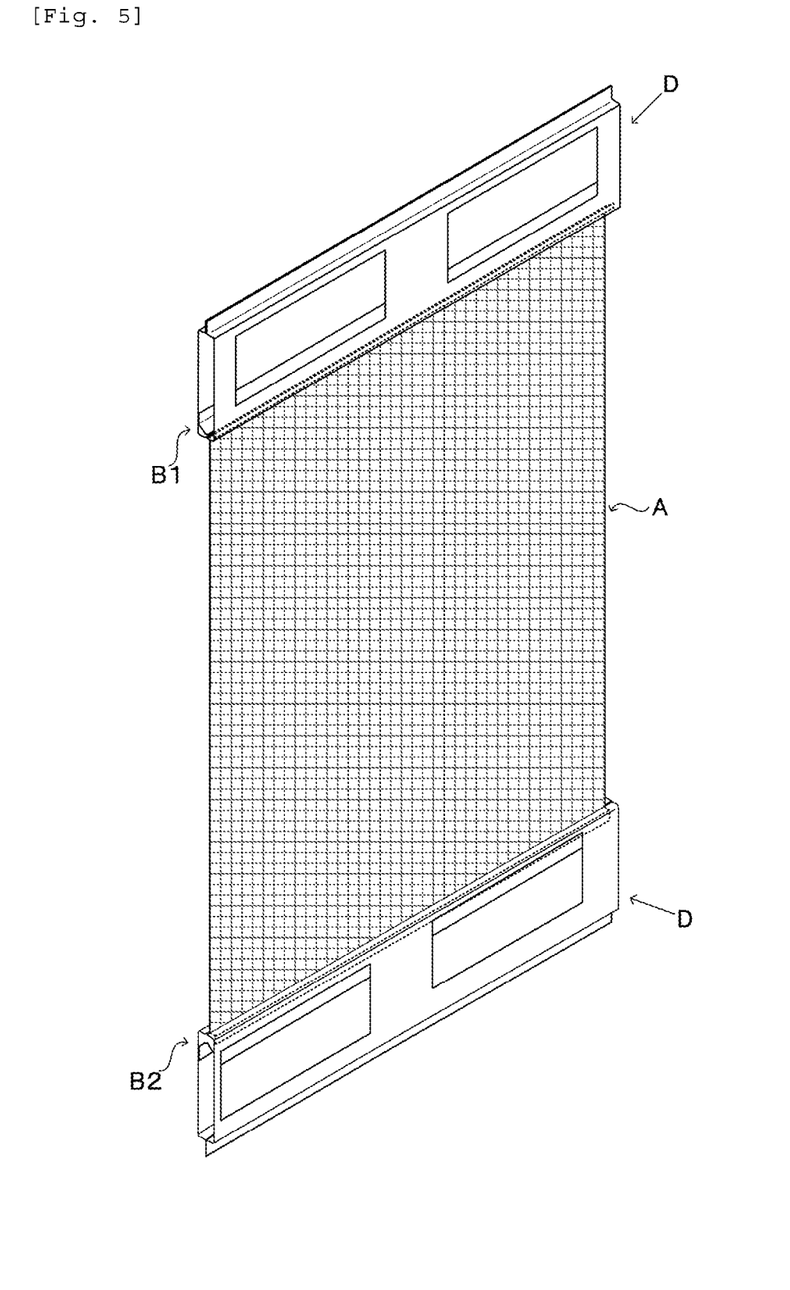
FIG. 5 is a schematic perspective view illustrating an example in which the attachment portions provided at upper and lower positions of the plate-like electrode substrate A shown in FIG. 3 is inserted into the suspension jig B1 shown in FIG. 4 and into a lower jig B2 so as to suspend the substrate.
Figure 7A:
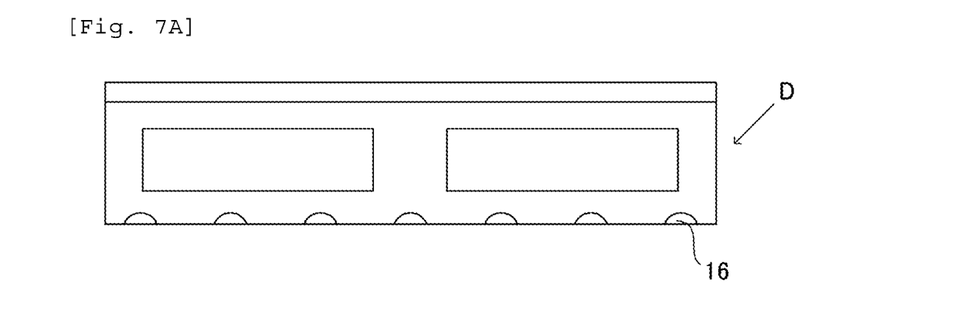
FIG. 7A is a schematic view for illustrating an exemplary embodiment in which a drainage hole is further provided to the suspension jig B1 of the present invention shown in FIG. 1A.
Figure 7B:
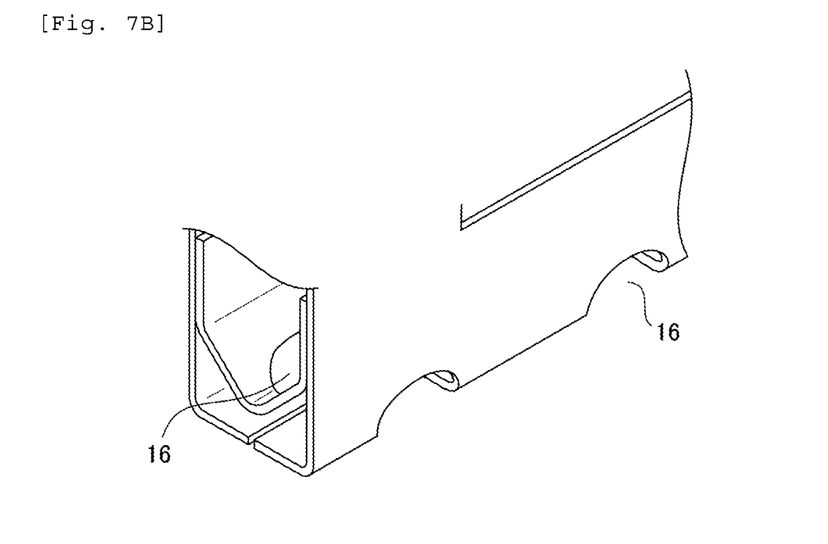
FIG. 7B is a schematic perspective view for illustrating the exemplary embodiment in which the drainage hole is further provided to the suspension jig B1 of the present invention shown in FIG. 1A.

In FIGS. 4 and 5, the suspension jig B1 of the present invention is shown as an elongated integral-type jig having a width substantially equivalent to that of the attachment portion A1 of the rectangular plate-like electrode substrate A, but the present invention is not limited thereto. The suspension jig B1 may be a dividable jig including a plurality of members (not illustrated). Although the suspension jig B1 is not limited in material, it is preferable to use one having excellent durability such as heat resistance and chemical resistance, considering the fact that the suspension jig is subjected to coating, firing and the like while being suspended and the fact that the electrode substrate A is used repetitively. The movement restriction portion C having the contact surface 11 is required to make it have adequate strength since the edge 5 at the leading end of the second planar portion 4 of the electrode substrate A comes into contact with the movement restriction portion C, causing the rotational moment on the electrode substrate A. It is also desired to make the jig light in order to improve workability. Examples of the material satisfying these properties include pure titanium and titanium alloy. In order to reduce the jig in weight, it is also efficient to provide openings to a side surface of the frame D as shown in the drawings. In the present invention, it is also efficient to provide drainage holes 16 to the movement restriction portion C or the frame D as illustrated in FIGS. 7A and 7B since the electrode substrate A is subjected to coating, cleaning, and the like while being suspended by the suspension jig B1.

Figure 6B:
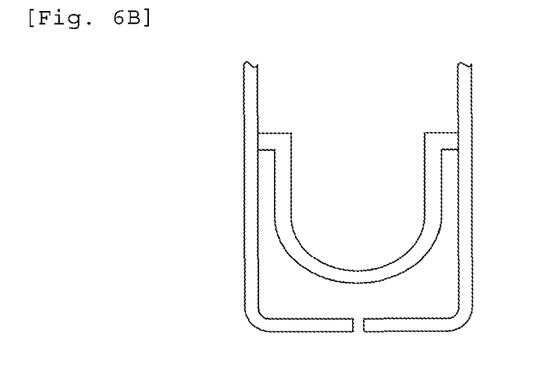
FIG. 6B is a schematic view for illustrating another embodiment of the movement restriction portion having the contact surface in the suspension jig B1 of the present invention.
Figure 6C:
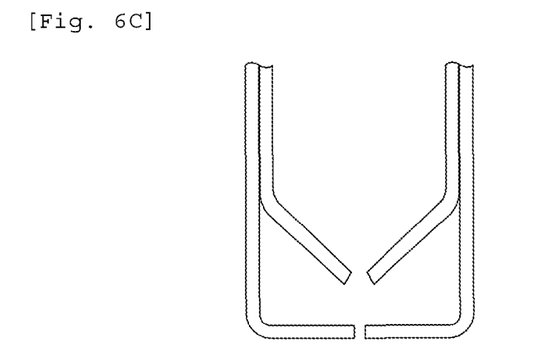
FIG. 6C is a schematic view for illustrating still another embodiment of the movement restriction portion having the contact surface in the suspension jig B1 of the present invention.
Figure 6D:
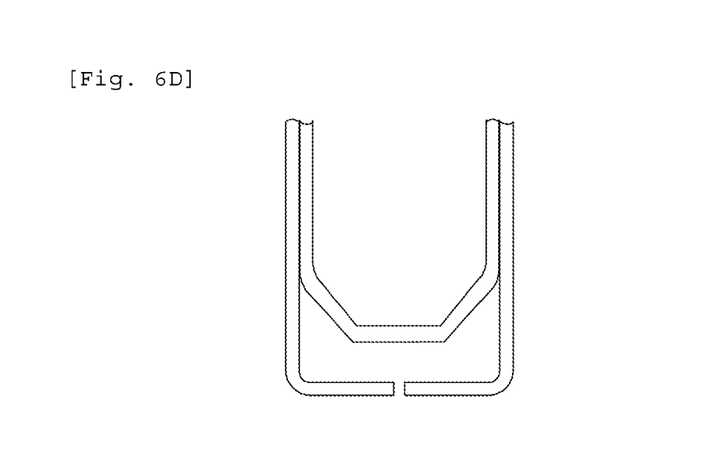
FIG. 6D is a schematic view for illustrating still another embodiment of the movement restriction portion having the contact surface in the suspension jig B1 of the present invention.
Figure 6E:
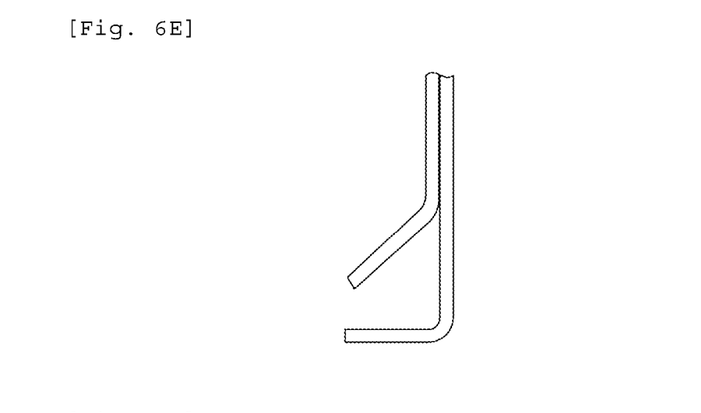
FIG. 6E is a schematic view for illustrating still another embodiment of the movement restriction portion having the contact surface in the suspension jig B1 of the present invention.

In the suspension jig 1 shown in FIGS. 1A, 4, and 6A, the movement restriction portion C having the contact surface 11 is shaped into a groove shaped gutter having a V shape. The movement restriction portion C has a symmetrical structure in which two contact surfaces 11 one of which the edge 5 at the leading end of the second planar portion 4 of the electrode substrate A comes into contact with are provided at opposing positions. Therefore, when the rectangular plate-like electrode substrate A formed with the attachment portion is inserted from a side end surface of the suspension jig, it is possible to insert the electrode substrate A without specifying an orientation of the surface of the substrate, which leads to an advantage that workability improves. Furthermore, in the illustrated example, the movement restriction portion C is shaped into a groove shaped gutter having a V shape so that it is possible to enhance the strength of the contact surface 11 and to enhance durability of the suspension jig B1. However, the present invention is not limited to this embodiment, and the contact surface 11 maybe curved as shown in FIG. 6B. Alternatively, the contact surface 11 may have a V shape with no central portion as shown in FIG. 6C, or may have a V shape with flat central portion as illustrated in FIG. 6D. Furthermore, the movement restriction portion C having the contact surface 11 may be provided at one position, for example, as illustrated in FIG. 6E. Although this embodiment is inferior from the aspect in improvement of workability, the desired object of the present invention can be achieved.

In the illustrated examples, regarding the frame D which essentially includes the movement restrict ion port ion C having the contact surface 11 and the planar placement surface 10 for placing the first planar portion 3 of the electrode substrate A, the cross-sectional shape of the frame D is illustrated as a rectangle, but this point is not limited. For example, the cross-sectional shape of the frame D may be a circle, an ellipse, or a polygon such as a triangle and a pentagon. Furthermore, as illustrated in FIGS. 6A to 6D, when the contact surfaces 11 are provided at two symmetrical positions opposing each other, it is necessary to provide a slit (gap) in a bottom surface of the frame D included in the suspension jig B1 of the present invention so that the attachment portion A1 can be inserted thereinto. It should be noted that the shape other than the slit is not particularly limited. It is preferable that a width of the slit is slightly larger than a thickness of the conductive substrate used for forming the electrode substrate A, and the width is not particularly limited as long as it is wide enough for the attachment portion A1 to slidably insert into the slit as illustrated in FIG. 1A.

As described above, the frame D included in the suspension jig B1 of the present invention is not limited to the elongated integral shape as illustrated, and may be a jig including a plurality of divided members. The movement restriction portion C having the contact surface 11 may also include a plurality of divided members. For example, the frame D may have an elongated integral shape as illustrated, and the movement restriction portion C having the contact surface 11 may have divided structure. However, from a viewpoint of securing the strength and workability, the frame D is preferably formed into an elongated integral shape in accordance with the shape of the electrode substrate A as illustrated in the drawing.

<Lower Jig B2>

As described above, the lower jig B2 of the present invention is preferably shaped similar to the embodiment of the suspension jig B1 from a viewpoint of preventing wrinkles and bulges that occur on the flat electrode formation surface A3 subjected to the heat treatment and the like while being suspended so as to be form into an electrode as a product. With such a structure, uniform tension is applied to the entire surface of the rectangular plate-like electrode substrate A suspended by the suspension jig B1 and the lower jig B2, which further reduces occurrence of distortion. As a matter of course, as illustrated in FIG. 5, since an orientation of the lower jig B2 in use is different from that of the suspension jig B1, when the attachment portion A2 is similarly inserted into the lower jig B1, the first planar portion 3 of the attachment portion A2 is not placed but brought into contact with a portion described as the planar placement surface 10 in the suspension jig B1. Therefore, although the portion is shaped similarly to the embodiment of the placement surface 10, it is referred to as a planar contact portion in description of the lower jig. Other parts in the lower jig B2 of the present invention are similar to those in the suspension jig B1 so that description thereof will be omitted.

<Method for Attaching Electrode Substrate A to Jig>

Taking a method for attaching the attachment portion A1 of the electrode substrate A to the suspension jig B1 illustrated in FIGS. 1A and 1B as an example, hereinafter described is a method for suspending the electrode substrate A between the suspension jig B1 and the lower jig B2. The attachment portion A1 is formed at the end of the electrode substrate A by linearly bending two parts so that each part has an overall even side. The suspension jig B1 employs an embodiment capable of slidably holding the electrode substrate A by inserting the attachment portion A1 into the suspension jig B1. Specifically, as shown in FIG. 1A, the side end of the attachment portion A1 is inserted into the side end surface of the suspension jig B1 and moved horizontally as it is so that the attachment portion A1 can be housed in the suspension jig B1. Furthermore, as illustrated in FIGS. 1B and 5, while the attachment portion A1 is housed, the first planar portion 3 composing the attachment portion A1 is placed on the planar placement surface 10 of the suspension jig B1, and is fixed thereon. Although it is not illustrated, the lower jig B2 is also configured to house the attachment portion A2 provided to the electrode substrate A in a similar manner as described above. Accordingly, as illustrated in FIG. 5, the electrode substrate A is suspended by the suspension jig B1 and the lower jig B2 while uniform tension is applied to the flat electrode formation surface A3 that is to be an electrode.

Then, operations such as coating, heat treatment and the like are performed on the electrode substrate A that is suspended in the aforementioned state. In this case, wind pressure and fluid pressure are applied to the flat electrode formation surface A3 of the electrode substrate A so that the suspended electrode substrate A may move like a pendulum. In other words, in that case, as illustrated in FIGS. 2B to 2D, the attachment portion A1 of the electrode substrate A rotates. In that case, the electrode substrate A should not be in a state illustrated in FIG. 8 as described above. Therefore, in the present invention, it is required to provide the aforementioned movement restriction portion C having the contact surface 11 to the suspension jig B1 so that the edge 5 at the leading end of the attachment portion A1 comes into contact with the contact surface 11 when the electrode substrate A rotates. In this case, as described above, it is preferable to design the movement restriction portion C having the contact surface 11 in such a manner that the angle θ1 formed by a tangential line of a circular arc track drawn by the movement of the edge relative to the contact surface 11 is set to 90°+45°. With such a structure, it is possible to enhance the resistance against the downward pulling force applied to the electrode substrate A.

In such manners, in the method for manufacturing an electrode of the present invention, it is preferable that the electrode substrate A suspended by the suspension jig B1 and the lower jig B2 and by the attachment portions A1 and A2 is subjected at least to heat treatment so as to form a portion that is to be an electrode, and then the attachment portions is cut to obtain an electrode. Each treatment required for obtaining an electrode may be carried out by a conventional method, and is not limited to any particular method. Hereinafter, each treatment required for obtaining an electrode will be roughly described.

<Pretreatment>

Examples of the pretreatment performed on the electrode include blasting, annealing, and etching. Among them, annealing and etching are performed while the electrode substrate A is suspended.

<Formation of Catalyst Layer>

An application liquid containing a material that forms a catalyst layer such as a platinum group metallic salt solution is applied to the flat electrode formation surface A3 of the pretreated electrode substrate A, thereby a coating layer for forming a catalyst layer is formed. Usually, the application liquid is applied to one surface of the flat electrode formation surface indicated by the reference numeral A3. Then, for example, the electrode formation surface A3 is fired for about 10 to 40 minutes at a firing temperature of 400 to 600° C., and is subjected to heat treatment so that a catalyst layer is formed on the plane of the electrode substrate A.

<Post-Treatment>

The electrode substrate A formed with the catalyst layer in the aforementioned manner is further subjected to post-baking as post-treatment. Furthermore, for example, in a case where the electrode substrate A is a cathode substrate, alkali treatment is performed. After these post-treatments, the attachment portions A1 and A2 provided at the opposing ends of the electrode substrate A are cut off to obtain only the flat electrode formation surface A3, thereby obtaining an electrode. Alternatively, the electrode substrate A is dismounted from the suspension jig B1 and the lower jig B2, and the bent portions are flattened with a roller and the like so as to obtain an electrode. As the electrode substrate A is flattened, the attachment portions A1 and A2 play a role as margins when attaching to an ion exchange membrane.

In the method for manufacturing an electrode according to the present invention, the electrode substrate A in the suspended state is subjected to heat treatments during the aforementioned annealing, formation of the catalyst layer, and post-baking. In this case, the electrode substrate A and the jigs B1 and B2 are not fixed by a fastening unit and the like, and the electrode substrate A is slidably held by these jigs. In manufacturing a cathode as an example, the electrode substrate A is made of nickel, and the jigs are made of titanium and the like. That is, the materials used for each of the electrode are different. When these materials are heated during the heat treatments in the aforementioned steps, the electrode substrate A and the jigs expand thermally, causing a difference in thermal expansion because of the different materials. In this case, in the present invention, the electrode substrate A and the jigs B1 and B2 are not fixed by the fastening unit and the like so that they are not restrained by the thermal expansion. Furthermore, the attachment portions A1 and A2 provided to the electrode substrate A of the present invention are not shaped into a zigzag as in the related art, but are simply formed by linearly bending two parts so that each part has an overall even side. Therefore, in performing the treatment, it is possible to prevent distortion attributed to the processes from occurring in the vicinity of a boundary between the attachment portions and the flat electrode formation surface A3 which is to be an electrode as a product.

Accordingly, in an electrode as a product obtained by the method for manufacturing an electrode according to the present invention, wrinkles and bulges hardly occur so that it is possible to expect not only the aforementioned effect of preventing the electrode substrate A from falling off the jig but also an effect of markedly improving a yield rate of an electrode as a product.

REFERENCE SIGNS LIST

A: ELECTRODE SUBSTRATE
A1, A2: ATTACHMENT PORTION
A3: ELECTRODE FORMATION SURFACE
B1: SUSPENSION JIG
B2: LOWER JIG
C: MOVEMENT RESTRICTION PORTION
D: FRAME
1: FIRST BENT PORTION OR EDGE THEREOF
2: SECOND BENT PORTION
3: FIRST PLANAR PORTION
4: SECOND PLANAR PORTION
5: EDGE
10, 12: PLACEMENT SURFACE
11, 13: CONTACT SURFACE
15: CORNER AT END OF SUSPENSION JIG B1
16: DRAINAGE HOLE

The invention claimed is:
1. A method for manufacturing an electrode, the method comprising:
holding an electrode substrate having a rectangular plate-like shape, being formed with attachment portions at two ends including opposing sides of the electrode substrate so that the electrode substrate is in a suspended state by a suspension jig and a lower jig at the attachment portions; and performing at least heat treatment on a flat electrode formation surface of the suspended electrode substrate so as to manufacture an electrode surface that is to be an electrode, wherein the attachment portions are independently formed at the ends each including one side of the electrode substrate, and each of the attachment portions is formed by linearly bending two parts so that each part has an overall even side, and each of the attachment portions includes a first planar portion that protrudes from the electrode formation surface as a first bent portion is formed by bending the electrode substrate in one surface of the electrode substrate; and a second planar portion that includes the one side as an edge and that is formed as a second bent portion is formed by bending an end of the first planar portion so as not to oppose the electrode formation surface and to face the same direction as the electrode formation surface, and wherein the suspension jig includes at least a placement portion having a planar shape, being configured to place the first planar portion; and a movement restriction portion having a contact surface with which the edge at a leading end of the second planar portion comes into contact, and wherein the lower jig includes at least a contact portion having a planar shape with which the first planar portion comes into contact; and a movement restriction portion having a contact surface with which the edge at the leading end of the second planar portion comes into contact;

inserting one of the attachment portions into the suspension jig; and inserting the other attachment portion into the lower jig so as to perpendicularly suspend the electrode substrate with the suspension jig, thereafter performing at least the heat treatment on the electrode formation surface while maintaining the electrode substrate in a suspended state.

2. The method for manufacturing an electrode according to claim 1, wherein a surface structure with the contact surface of the suspension jig is an inclined surface that is inclined downward toward a placement surface of the placement portion from a position with which the edge comes into contact, or is a curved surface protruding toward the placement surface of the placement portion from the position with which the edge comes into contact.

3. The method for manufacturing an electrode according to claim 1, wherein a surface structure with the contact surface of the lower jig is an inclined surface that is inclined upward toward the contact portion from a position with which the edge comes into contact, or is a curved surface protruding toward the contact portion from the position with which the edge comes into contact.

4. The method for manufacturing an electrode according to claim 2, wherein the suspension jig is provided with two movement restriction portions having the surface structure at opposing positions.

5. The method for manufacturing an electrode according to claim 3, wherein the lower jig is provided with two movement restriction portions having the surface structure at opposing positions.

6. The method for manufacturing an electrode according to claim 1, wherein the movement restriction portion is designed in such a manner that an angle formed by a tangential line of a circular arc track that is drawn when the edge moves relative to the contact surface is set to 90°±45°.

7. The method for manufacturing an electrode according to claim 1, wherein the electrode substrate having a rectangular plate-like shape is in a meshed pattern.

8. The method for manufacturing an electrode according to claim 1, wherein the suspension jig has an elongated shape equivalent to or longer than a length of each end of the electrode substrate formed with the attachment portions.

* * * * *